(12) United States Patent
Pirmann et al.

(10) Patent No.: US 7,432,512 B2
(45) Date of Patent: Oct. 7, 2008

(54) CASSETTE FOR STORAGE PHOSPHOR PLATE AND APPARATUS FOR REMOVING STORAGE PHOSPHOR PLATE FROM CASSETTE

(75) Inventors: Anton Pirmann, Munich (DE); Rudolf Loistl, Unterhaching (DE); Jürgen Heinz, Marktoberdorf (DE); Thomas Hartmann, Uffing am Staffelsee (DE); Alfons Kastl, Aying (DE); Günther Schindlbeck, Munich (DE); Hans Ketterer, Putzbrunn (DE); Otto Butz, Neufahrn (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 0 days.

(21) Appl. No.: 11/552,614

(22) Filed: Oct. 25, 2006

(65) Prior Publication Data
US 2007/0114448 A1   May 24, 2007

(30) Foreign Application Priority Data
Nov. 24, 2005   (EP)   ................... 05111252

(51) Int. Cl.
*G01J 1/58* (2006.01)
(52) U.S. Cl. .............. 250/484.4; 250/582; 250/581; 250/484.2
(58) Field of Classification Search ............ None
See application file for complete search history.

(56) References Cited

U.S. PATENT DOCUMENTS

| | | | |
|---|---|---|---|
| 3,286,092 A | | 11/1966 | Sames |
| 3,652,853 A | * | 3/1972 | Williner et al. ............. 378/182 |
| 4,434,501 A | * | 2/1984 | Pfeiffer ...................... 378/187 |
| 4,493,417 A | | 1/1985 | Ackeret |
| 4,788,810 A | | 12/1988 | Bauer et al. |

(Continued)

FOREIGN PATENT DOCUMENTS

EP   1 494 068 A1   1/2005

(Continued)

OTHER PUBLICATIONS

Search Report from European Patent Application No. 05111252.2-2217, filed on Nov. 24, 2005.

(Continued)

*Primary Examiner*—David P. Porta
*Assistant Examiner*—Yara B Green
(74) *Attorney, Agent, or Firm*—Houston Eliseeva LLP

(57) ABSTRACT

A cassette (1) for a storage phosphor plate (2) comprises a cassette housing (4) with an opening (7) and a support (3) disposed movably within the cassette housing (4), wherein the storage phosphor plate (2) lies on the support (3). In order to simplify the structure of the cassette (1) and of the corresponding removal mechanism, provision is made such that the support (3) can be moved, together with the storage phosphor plate (2) lying on top of it, through the opening (7) of the cassette housing (4), at least partially from the inside of the cassette housing (4), and the storage phosphor plate (2) lying on the support (3) can be taken from the support (3) when the support (3) is located, with the storage phosphor plate (2) lying on top of it, at least partially outside of the cassette housing (4).

8 Claims, 2 Drawing Sheets

U.S. PATENT DOCUMENTS

| | | | |
|---|---|---|---|
| 4,870,285 A * | 9/1989 | Ohgoda | 250/484.4 |
| 4,889,989 A * | 12/1989 | Yoshimura et al. | 250/589 |
| 4,931,641 A | 6/1990 | Ohgoda | |
| 5,046,716 A * | 9/1991 | Lippold | 271/214 |
| 5,265,865 A | 11/1993 | Agano et al. | |
| 5,441,251 A * | 8/1995 | Ohta | 271/145 |
| 5,990,487 A | 11/1999 | Ngo | |
| 6,365,909 B1 | 4/2002 | Hayakawa et al. | |
| 6,693,728 B1 | 2/2004 | Kinoshita et al. | |
| 2004/0169152 A1 | 9/2004 | Tsutoh et al. | |
| 2004/0251596 A1 | 12/2004 | Csaszar et al. | |
| 2005/0104011 A1 | 5/2005 | Schindlbeck et al. | |
| 2005/0260517 A1 | 11/2005 | Schindlbeck et al. | |
| 2006/0091336 A1 | 5/2006 | Muller et al. | |
| 2007/0114479 A1 | 5/2007 | Heinz et al. | |

FOREIGN PATENT DOCUMENTS

| | | |
|---|---|---|
| EP | 1 494 069 A1 | 1/2005 |

OTHER PUBLICATIONS

Search Report from European Patent Application No. 05111252.2-2217, filed on Nov. 24, 2005.

* cited by examiner

CASSETTE FOR STORAGE PHOSPHOR PLATE AND APPARATUS FOR REMOVING STORAGE PHOSPHOR PLATE FROM CASSETTE

RELATED APPLICATIONS

This application claims priority to European Application No. EP05111252.2, filed on Nov. 24, 2005, which is incorporated herein by reference in its entirety.

BACKGROUND OF THE INVENTION

One way of recording X-ray pictures is to store the image generated by X-ray radiation passing through an object, for example a patient, as a latent picture in a so-called storage phosphor layer. In order to read out the latent picture, the storage phosphor layer is irradiated with stimulation light, and so stimulated into emitting emission light. The emission light, the intensity of which corresponds to the picture stored in the storage phosphor layer, is collected by an optical detector and converted into electric signals. The electric signals are further processed as required, and finally made available for analysis, in particular for medical/diagnostic purposes in that they are displayed on a corresponding display unit, such as e.g. a monitor or a printer.

Patent application U.S. 2004/0251596 A1 discloses a cassette with a movable support within the cassette on which a flexible storage phosphor plate is located. As one starts to remove the storage phosphor plate from the cassette, the cassette is opened by opening a closure flap, and the support within the cassette is moved forward in the direction of the cassette opening until finally, it strikes a guide element disposed in the region of the cassette opening on the cassette floor, by means of which it is pressed downwards, and is in this way released from the storage phosphor plate. The storage phosphor plate is then withdrawn from inside the cassette with a mechanism, not described in greater detail, and introduced into a read-out device. During the conveyance within the cassette, the support is guided along the inner edge of the cassette by slide- or roller-bearings.

SUMMARY OF THE INVENTION

The mechanism of the cassette described above required to remove the storage phosphor plate is relatively complex. Moreover, when the closure flap is open, the storage phosphor plate can fall out of the cassette if the cassette is orientated aslant or vertically.

It is the object of this invention to provide a cassette with a simpler structure for a storage phosphor plate and a corresponding apparatus for removing the storage phosphor plate from the cassette, where in particular the storage phosphor plate is prevented in a simple way from falling out unintentionally when the closure flap is open.

This object is fulfilled using a support, together with the storage phosphor plate lying on top of it. The support can be at least partially moved out from the inside of the cassette housing by opening the cassette housing, and the storage phosphor plate lying on the support can be taken from the support when the support, with the storage phosphor plate lying on top of it, is located at least partially outside of the cassette housing.

Due to the fact that the support, together with the storage phosphor plate, is at least partially drawn out of the cassette, the complex mechanism used in the past, with which the support is only movable within the cassette, can be substantially simplified. Moreover, the storage phosphor plate which is located partially outside of the cassette can be taken from the support in a simpler way, e.g. by means of powered carrier rollers or similar, and conveyed to a read-out device.

In a preferred embodiment of the cassette according to the invention, provision is made such that the support has at least one fixing element which fixes the storage phosphor plate in place on the support when the support is located, with the storage phosphor plate lying on top of it, within the cassette housing. At the same time, the fixing element releases the storage phosphor plate when the support is located, with the storage phosphor plate lying on top of it, at least partially outside of the cassette housing so that the storage phosphor plate can be taken from the support. This embodiment of the invention is based upon the idea of achieving fixing of the storage phosphor plate in the cassette not by means of a closure flap provided on the cassette opening, but by means of a movable fixing element located on the support. In this way it is guaranteed that the storage phosphor plate located in the cassette can not fall out of the cassette when the closure flap is open with aslant or vertical positioning of the cassette.

In a preferred further development of this embodiment, provision is made such that the fixing element is counter-sunk into the support when the support, with the storage phosphor plate lying on top of it, is located at least partially outside of the cassette housing so that the storage phosphor plate is released. By counter-sinking the fixing element into the support, it is possible for the released storage phosphor plate to be taken from the support easily, in particular without having to lift the plate, and in particular be drawn away in a direction parallel to the plane of the support.

Preferably, the fixing element comprises a leaf spring which is disposed in the plane of the support and has a projection which can protrude over the plane of the support. In particular, the projection extends substantially perpendicularly to the plane of the support. In this way the fixing element according to the invention can be realised in a particularly simple and reliable way.

Moreover, it is preferred that the leaf spring is formed from a part-region of the support. In this way the support and the fixing element can be produced in a single production step and/or as one part, and therefore particularly cost-effectively.

Preferably, the leaf spring is pre-stressed against the support such that the projection protrudes out of the plane of the support, and thus fixes the storage phosphor plate in place on the support when the support is located within the cassette housing, and the projection is counter-sunk into the support when the support, with the storage phosphor plate lying on top of it, is located at least partially outside of the cassette housing. By means of the described pre-tensioning of the leaf spring, the fixing and release of the storage phosphor plate on the support are made possible in a particularly simple way.

In one embodiment of this variation, a pressing element is provided by means of which the pre-tensioned leaf spring is pressed into the support such that the projection protrudes from the plane of the support when the support is located within the cassette housing. For this, the pressing element is preferably located on the bottom of the cassette housing, beneath the support, or is formed by the bottom of the cassette housing itself.

Moreover, it is preferred that the support has at least one recess by means of which a conveyance device can engage with the storage phosphor plate lying on the support, and thus take the storage phosphor plate from the support, and in particular draw it away in a direction parallel to the plane of the support. The storage phosphor plate can thus be taken from the support in a simple way.

Preferably, the conveyance device comprises at least one mating roll with a first and a second roller, the first roller pressing onto the storage phosphor plate from below by means of the recess, and the second roller pressing onto the storage phosphor plate from above. The first and/or second roller is mechanically powered.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1A:
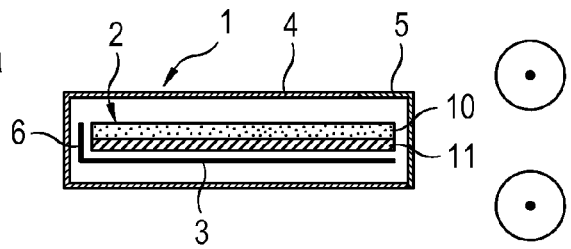
FIGS. 1a) to 1e) are schematic side views (cross-section) of the cassette according to the invention in different phases during removal of the storage phosphor plate.

FIGS. 1a) to 1e) show a cassette 1 according to the invention in different phases during the removal of a storage phosphor plate 2. The cassette 1 comprises a cassette housing 4 with an opening which is sealed from light by means of a pivotable closure flap 5. Within the cassette housing 4, there is a level support 3 on which the storage phosphor plate 2 lies.

The storage phosphor plate 2 usually substantially consists of a storage phosphor layer 10 which is applied to a substrate 11. The storage phosphor layer 10 is made up, for example, of powdery storage phosphor particles which are applied to the substrate 11 by means of a suitable binder. Alternatively, the storage phosphor layer 10 can comprise a plurality of needle-shaped phosphor structures which are preferably produced by vaporisation on the substrate 11. The corresponding storage phosphor plates are therefore also called Powder Image Plates (PIP) or Needle Image Plates (NIP).

The substrate 11 is preferably a thin, flexible foil made of a material through which X-rays can pass, such as e.g. synthetic. The storage phosphor plate 2 lies with its substrate 11 loose on the support 3, and is substantially held on the support 3 by friction forces and/or form-fit, e.g. by means of one or more peripheral elements 6 and/or fixing elements.

Figure 1B:
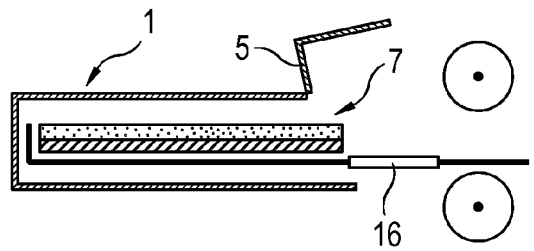
Figure 1C:
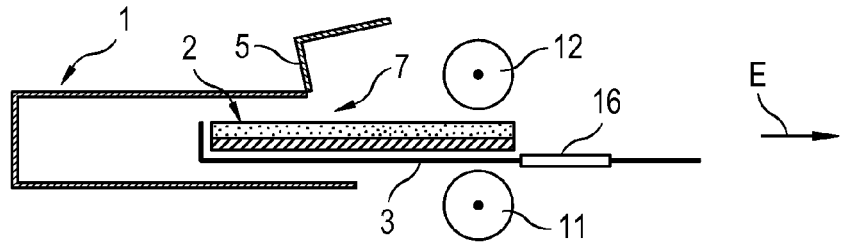

FIG. 1b) shows a first phase of the removal process in which the front-side opening 7 of the cassette 1 is released by raising a pivotable closure flap 5. A removal device 16 engages with the edge of the support 3 and conveys the latter, as shown in FIG. 1c), together with the storage phosphor plate 2 lying on top of it, out of the cassette 1 in direction E to the region of a conveyance device which, in the example shown, has a first and second carrier roller 11 and 12.

Figure 1D:
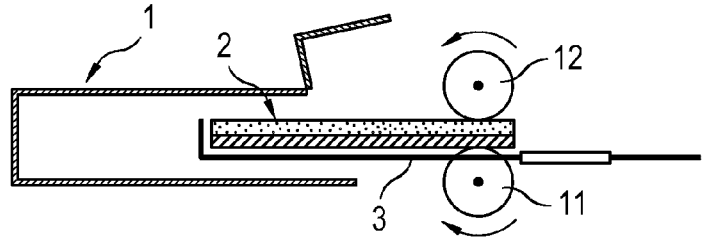
Figure 1E:
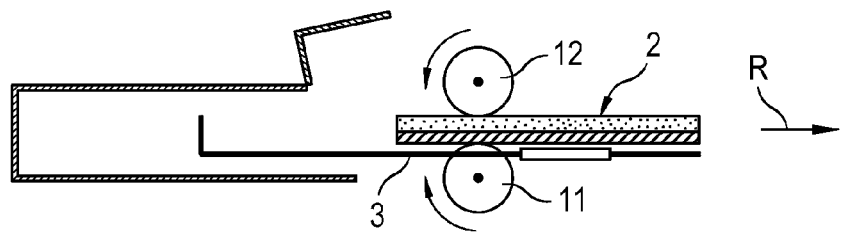

In the phase of the removal process shown in FIG. 1d), the carrier rollers 11 and 12 lie on both sides of the storage phosphor layer 2, and can draw these away from the support 3 in direction R, as shown in FIG. 1e).

Figure 2:
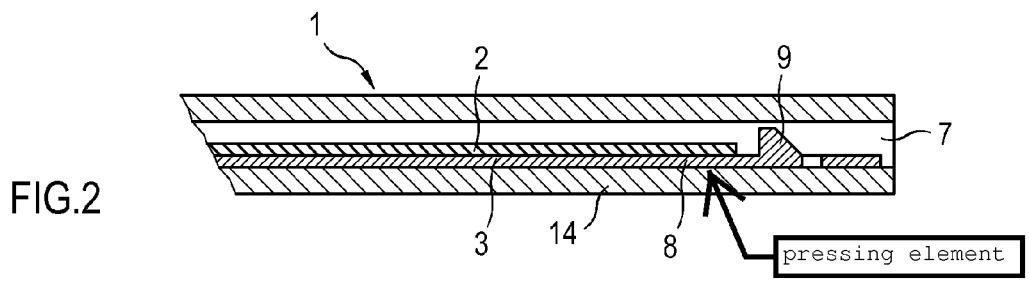
FIG. 2 is a cross-section through the cassette when the support is located, with the storage phosphor plate, within the cassette.

FIG. 2 shows a section of a cross-section through the cassette 1 according to the invention when the support 3 is located, together with the storage phosphor plate 2, fully within the cassette 1. In the preferred embodiment of the invention shown here, there is a leaf spring 8 located in the plane of the support 3 which has a projection 9 protruding from the plane of the support 3. The projection 9 prevents the storage phosphor plate 2 from being able to fall out of the cassette 1 through the opening 7 in the cassette housing 4 when the closure flap is open (not shown here) when the cassette is in a vertical or slanted position.

Figure 3:
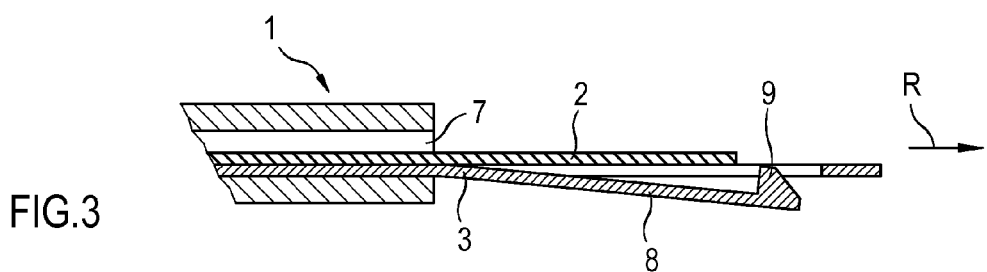
FIG. 3 is a cross-section through the cassette when the support is located, along with the storage phosphor plate lying on top of it, outside of the cassette.

FIG. 3 shows a section of a cross-section through the cassette when a part of the support 3, together with the storage phosphor plate 2 lying on top of it, is located outside of the cassette 1. In this state, the leaf spring 8 leaves the plane of the support 3 in a downwards direction. The projection located on the leaf spring 8 is in this way also sunk downwards and moved out of the plane of the support 3. The storage phosphor plate 2 is thus released, and can be drawn away from the support 3 in direction R.

As can be seen from FIGS. 2 and 3, the leaf spring 8 is pre-tensioned such that the projection 9 is moved downwards, out of the plane of the support 3, when the latter is located at least partially outside of the cassette 1, and moved back into the plane of the support 3 when the support 3 is located within the cassette 1. The leaf spring 8 is pressed here by the bottom 14 of the cassette itself, or by a pressing element (not shown) disposed on the bottom 14 of the cassette in the direction of the plane of the support 3.

Figure 4:
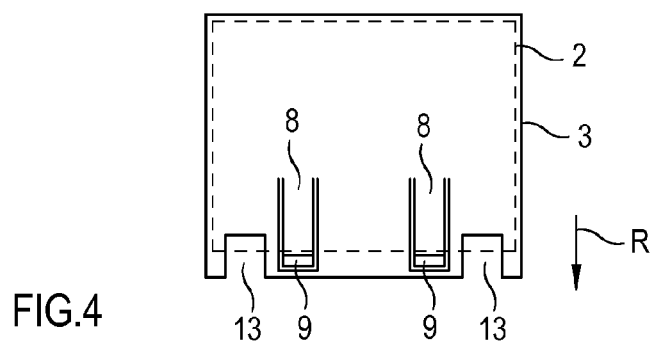
FIG. 4 is a top view of an example of a support.

FIG. 4 shows a top view of an example of the support 3. The storage phosphor plate 2 lying on the support 3 is indicated by a dashed line. The support 3 has two leaf springs 8, the projections 9 of which fix the storage phosphor plate 2 in place on the support 3 when the latter is located within the cassette (as described by means of FIGS. 2 and 3). In this way, the storage phosphor plate 2 is prevented from falling out of the open cassette in a simple and reliable way.

The support 3 is preferably produced from a material, in particular a synthetic, through which X-rays can pass. The leaf springs 8 in particular are made of the same material as the support 3, and can be produced together with the support 3 in one production step, e.g. using the injection moulding method. Alternatively however, the leaf springs 8 can be obtained after production of the support 3 by sawing them out of the support 3. In the latter case, the aforementioned pre-tensioning of the leaf springs 8 can be implemented by heating and corresponding forming of the leaf springs 8.

If the support 3 is located, together with the storage phosphor plate 2 lying on top of it, outside of the cassette (see FIG. 3), the leaf springs 8 together with the projections 9 located on top of them are sunk perpendicularly to the plane of the drawing, and release the storage phosphor plate 2 so that the latter can be drawn away from the support 3 in the direction R and be conveyed to a read-out device.

In the example shown, the storage phosphor plate 2 is drawn away from the support 3 by powered carrier rollers 11 and 12 (see FIG. 1e). For this, the support 3 has recesses 13 through which the respective first carrier roller 11 located beneath the support 3 can engage with the storage phosphor plate 2. Opposite the first carrier roller 11, the second carrier roller 12 presses from above onto the storage phosphor plate 2. At least one of the two carrier rollers 11 and 12 is powered and enables the storage phosphor plate to be conveyed away from the support 3 in direction R.

Figure 5:
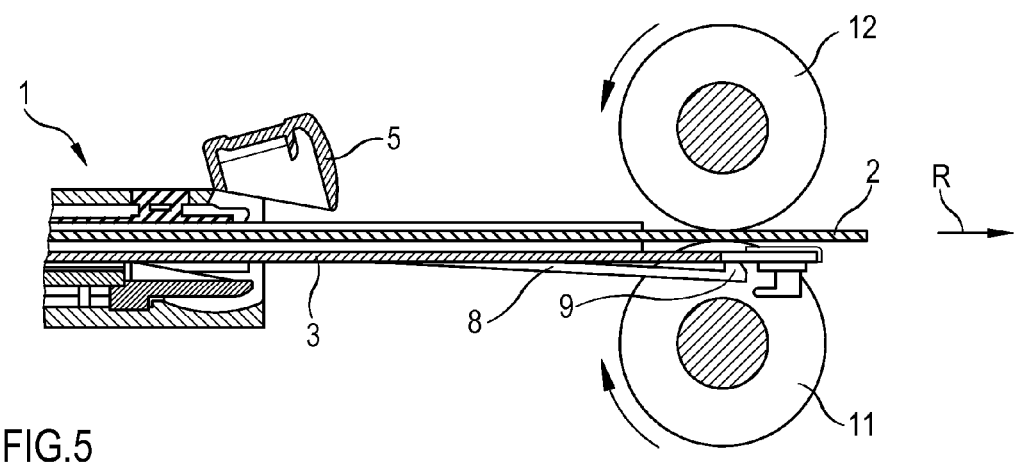
FIG. 5 is a detailed illustration of a cross-section of the cassette according to the invention shown as a side view.

FIG. 5 shows a detailed illustration of a cross-section of the cassette 1 according to the invention 1 with an open closure flap 5, shown as a side view. The support 3 is located, together with the storage phosphor plate 2 lying on top of it, partially outside of the open cassette 1, the projection 9 being moved out of the plane of the support by the leaf springs 8 and releasing the storage phosphor plate 2 which is drawn away from the support 3 in direction R by the first and second carrier rollers 11 and 12. The first carrier roller 11 passes through the support 3 via one of the recesses 13 (FIG. 4) and presses on the lower side of the storage phosphor plate 2.

While this invention has been particularly shown and described with references to preferred embodiments thereof, it will be understood by those skilled in the art that various changes in form and details may be made therein without departing from the scope of the invention encompassed by the appended claims.

What is claimed is:

1. A cassette for a storage phosphor plate, comprising
    a cassette housing with an opening and a bottom member; and
    a support disposed movably within the cassette housing;
    wherein the storage phosphor plate lies on the support and the support, together with the storage phosphor plate lying on top of the support, are capable of being moved at least partially out of the cassette housing in a direction parallel to a plane defined by the top of the support and the bottom member through the opening of the cassette housing, and the storage phosphor plate is capable of being taken from the support when the support is located at least partially outside of the cassette housing by moving the storage phosphor plate further in the direction;
    wherein the support includes at least one fixing element which: fixes the storage phosphor plate in place on the support when the support is located, with the storage phosphor plate lying on top of it, within the cassette housing; and releases the storage phosphor plate when the support is located, with the storage phosphor plate lying on top of it, at least partially outside of the cassette housing so that the storage phosphor plate can be taken from the support; and
    wherein the fixing element is counter-sunk into the support when the support is located, with the storage phosphor plate lying on top of it, at least partially outside of the cassette housing so that the storage phosphor plate is released, the fixing element comprising a leaf spring which is disposed in the plane of the support and has a projection which can protrude over the plane of the support.

2. The cassette according to claim 1, wherein the leaf spring is formed from a region of the support.

3. The cassette according to claim 1, wherein the leaf spring is pre-tensioned against the support such that the projection:
    protrudes out of the plane of the support and thus fixes the storage phosphor plate in place on the support when the support is located within the cassette housing, and
    is counter-sunk into the support when the support is located, with the storage phosphor plate lying on top of it, at least partially outside of the cassette housing.

4. The cassette according to claim 3, wherein the leaf spring is formed from a part of the support.

5. The cassette according to claim 3, further comprising a pressing element for engaging the pre-tensioned leaf spring to press the leaf spring onto the support such that the projection protrudes out of the plane of the support when the support is located within the cassette housing.

6. The cassette according to claim 5, wherein the pressing element is formed by the bottom of the cassette housing.

7. The cassette according to claim 5, wherein the pressing element is disposed on the bottom of the cassette housing beneath the support.

8. The cassette according to claim 1, wherein the support has at least one recess enabling a conveyance device to engage with the storage phosphor plate lying on the support to take the storage phosphor plate from the support.

* * * * *